United States Patent [19]

Harrington et al.

[11] Patent Number: 4,842,227
[45] Date of Patent: Jun. 27, 1989

[54] STRAIN RELIEF CLAMP

[75] Inventors: Robert L. Harrington, Eden Prairie; Terry G. Larson, Prior Lake; Richard F. Unger, New Prague, all of Minn.

[73] Assignee: Thermo King Corporation, Minneapolis, Minn.

[21] Appl. No.: 179,797

[22] Filed: Apr. 11, 1988

[51] Int. Cl.⁴ .............................................. F16L 5/00
[52] U.S. Cl. .................................... 248/56; 248/68.1; 248/74.4; 248/300
[58] Field of Search .................. 248/74.4, 56, 512, 513, 248/68.1, 300

[56] References Cited

U.S. PATENT DOCUMENTS

| | | | |
|---|---|---|---|
| 1,248,207 | 11/1917 | Tyner et al. | 248/56 X |
| 1,525,014 | 2/1925 | Volk, Jr. | 248/56 X |
| 2,362,160 | 11/1944 | Robertson | 248/56 |
| 2,735,636 | 2/1956 | Snyder | 248/56 X |
| 3,180,598 | 4/1965 | Girard | 248/68.1 |
| 4,488,696 | 12/1984 | Sauber | 248/74.4 |

FOREIGN PATENT DOCUMENTS 821512 11/1951 Fed. Rep. of Germany ...... 248/513

Primary Examiner—Alvin C. Chin-Shue
Assistant Examiner—David L. Talbott
Attorney, Agent, or Firm—D. R. Lackey

[57] ABSTRACT

A strain relief clamp suitable for protecting power cables, fuel lines, wire harnesses, and the like, which includes first and second identical metallic clamp members. Each of the first and second clamp members includes first and second ends and a right angle bend which forms first and second leg portions which respectively extend from the first and second ends to the bend. The first leg portions are corrugated to define curved recesses which cooperatively define elongated apertures when the first leg portions are fixed in assembled relation via aligned openings defined by the first leg portions. The second leg portions include openings adapted to fix the assembled first and second clamp portions to a housing associated with the items to be protected.

2 Claims, 2 Drawing Sheets

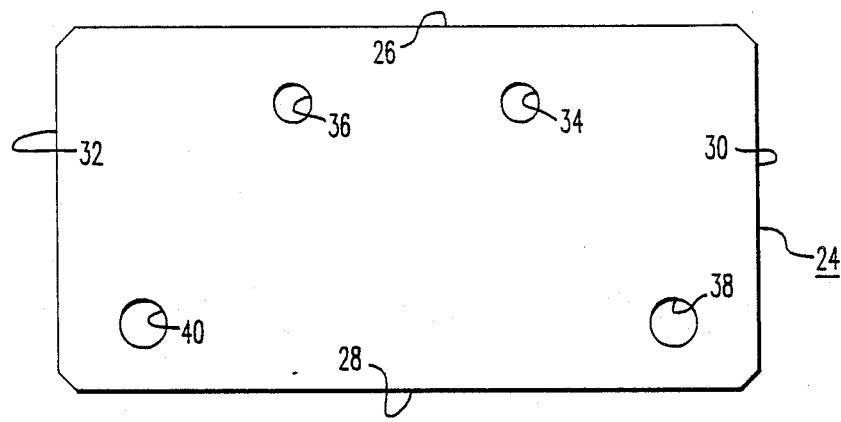
FIG. 2
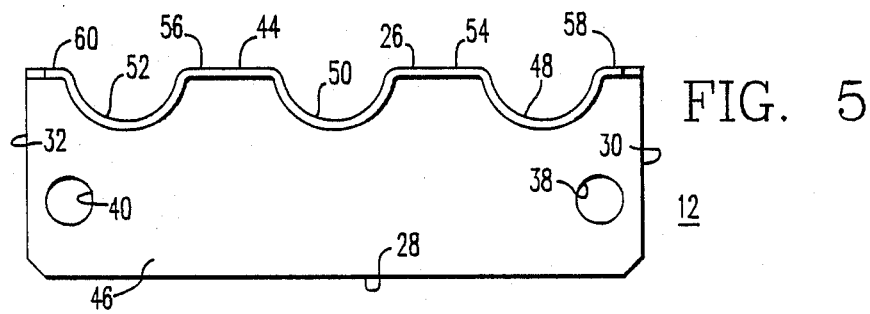
FIG. 5
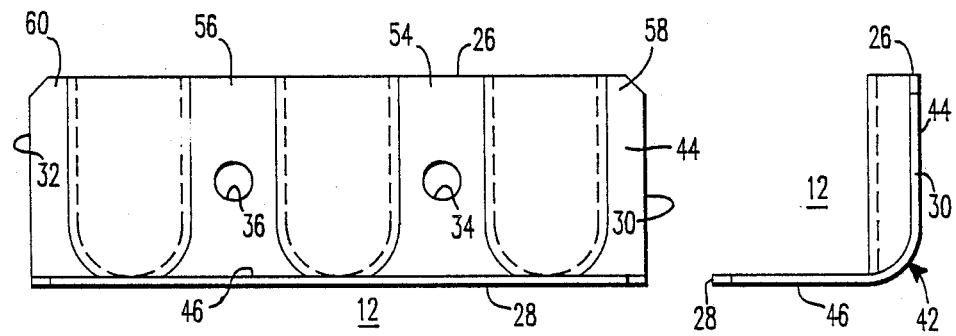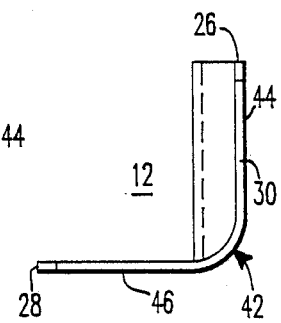
FIG. 3          FIG. 4

4,842,227

STRAIN RELIEF CLAMP

BACKGROUND OF THE INVENTION

1. Field of the Invention

The invention relates to strain relief clamps for protecting power cables, fuel lines, wire harnesses, and the like.

2. Description of the Prior Art

Transport refrigeration apparatus for trucks, trailers, and containers include power cable, fuel lines, wire harnesses, and various refrigerant piping, all of which is subject to continuous vibration during use. Commercially available strain relief devices, in addition to being costly, suffer disadvantages, such as being subject to fatigue failure, not being universally usable for electrical and piping, and/or not being rugged enough to adequately protect the intended items and the associated source housing. Thus, it is the object of the present invention to provide a low cost, rugged, reliable strain relief clamp universally suitable for holding and protecting electrical and piping items, as well as their source housings.

SUMMARY OF THE INVENTION

Briefly, the present invention is a strain relief clamp comprised of first and second identical metallic clamp members configured such that each identical clamp member may be formed by a single break and form operation. Because of the metal movement involved in the forming operation, stainless steel is preferred, such as the 300 series, to prevent tearing of the metal. Each clamp member is formed from a flat rectangular sheet of stainless steel having first and second ends, and first and second pairs of openings. The rectangular sheet is placed in a die and formed in a single operation in which a right angle bend forms first and second leg portions which respectively extend from the first and second ends to the right angle bend. The first leg portion is corrugated to define a plurality of die formed spaced curved recesses, such as three recesses, with the recesses extending from the first end into the bend, and partially into the second leg portion. The first and second pairs of openings are located in the first and second leg portions, respectively, with the first pair being located between the spaced recesses.

In use, one of the identical first and second clamp members has its second leg portion fixed to a source housing via fastener means and the second pair of openings, such that items to be protected lie in the spaced recesses of the first leg portion. The remaining clamp member then has its first leg portion fixed to the first leg portion of the clamp member previously fixed to the source housing, using the first pairs of openings, which are in alignment, and fastener means. The recesses in the adjacent first leg portions of the assembled clamp members define elongated apertures which ruggedly and reliably hold and protect wires or pipes, as required.

BRIEF DESCRIPTION OF THE DRAWINGS

The invention will be better understood and further advantages and uses thereof more readily apparent when considered in view of the following detailed description of exemplary embodiments, taken with the accompanying drawings, in which:

FIG. 2 is a view of a starting blank used to construct one of two identical clamp members which cooperatively form the assembly shown in FIG. 1;

FIG. 3 is an elevational view of a clamp member formed from the blank shown in FIG. 2;

FIG. 4 is an end elevational view of the clamp members shown in FIG. 3; and

FIG. 5 is a plan view of the clamp member shown in FIG. 3.

DESCRIPTION OF THE PREFERRED EMBODIMENTS

Figure 1:
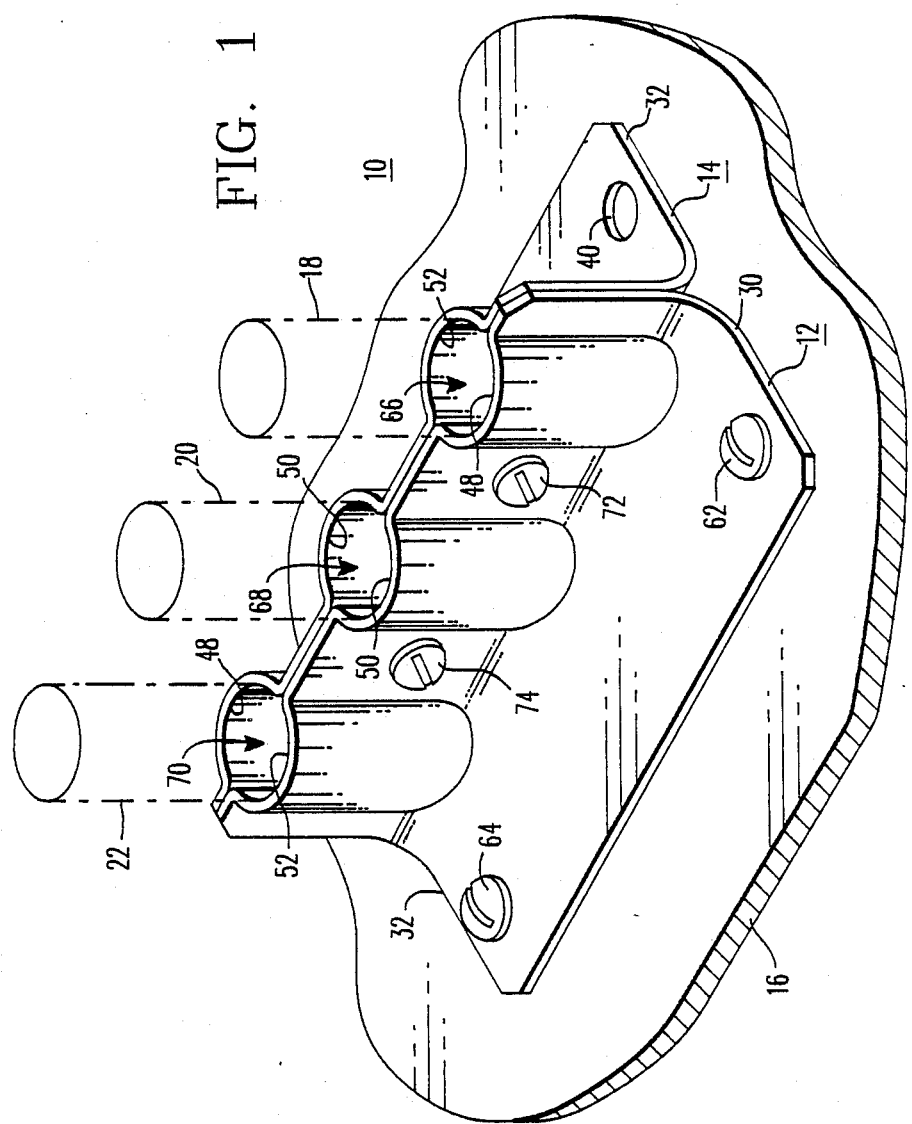
FIG. 1 is a perspective view of a strain relief clamp assembly constructed according to the teachings of the invention.

Referring now to the drawings, and to FIG. 1 in particular, there is shown a strain relief clamp assembly 10 constructed according to the teachings of the invention. Strain relief assembly 10 includes first and second identical clamp members 12 and 14, respectively. Assembly 10 is fixed to a source housing 16, for holding and protecting a plurality of electrical or piping items 18, 20 and 22, shown in phantom.

Each of the identical lamp members 12 and 14 starts from a flat metallic blank 24 shown in FIG. 2. Metallic blank 24 is formed from a sheet of metal, with stainless steel being preferred, such as a 300 series stainless, because of the relative severe die stretching that the blank 24 will be subjected to. A sheet of .049 inch thick stainless has been found to excellent, providing the desired ruggedness without tearing during the forming operation.

Blank 24, which is rectangular in configuration, has first and second ends 26 and 28, respectively, and first and second lateral edges 30 and 32. Openings 34 and 36 are provided in predetermined space relation from the first end 26, which form a first pair of openings, and openings 38 and 40 are provided in predetermined spaced relation from the second end 28, which form a second pair of openings.

Blank 24 is placed in a forming die and a complete clamp member is formed in a single break and form operation, as shown in FIGS. 3, 4 and 5. The clamp member shown in FIGS. 3, 4 and 5 is referenced 12, but it is the same as clamp member 14. The forming operation forms a right angle bend 42 intermediate the first and second ends 26 and 28, with bend 42 being best shown in FIG. 4, which is an end elevational view of clamp member 12. Bend 42 is not a sharp bend, but is radiused, such as with a .75 inch radius. Bend 42 divides the blank 24 into first and second leg portions 44 and 46, respectively, with the first leg portion 44 starting at the first end 26 and extending to bend 42, and with the second leg portion starting at the second end and extending to bend 42. Openings 34 and 36 are in the resulting first leg portion 44, and openings 38 and 40 are in the resulting second leg portion 46.

In addition to bending blank 24, the first leg portion 44 is die formed and stretched to create a plurality of spaced recesses, such as recesses 48, 50 and 52, in effect corrugating the leg portion. Instead of a true corrugation which is continuously curved, recesses 48, 50 and 52 are separated by flat portions 54 and 56, with openings 34 and 36 being located on blank 24 such that opening 34 is centered on flat portion 54 and opening 36 is centered on flat portion 56. Flat portions 58 and 60 are also formed between recess 48 and edge 30, and between recess 52 and edge 32, respectively. As shown in the plan view of clamp member 12 in FIG. 5, recesses 48, 50 and 52 extend from the first end 26 into bend 42, and partially into the second leg portion 46, to define recesses which are uniformly continuous from end to end. As shown in the end elevational view of FIG. 4, recesses 48, 50 and 52 extend into leg portion 46 for the dimension of the radius on bend 42.

In use, the first clamp member 12 is fixed to source housing 16, as shown in FIG. 1, adjacent to openings in the source housing associated with the items 18, 20 and 22 to be protected. Self tapping screws 62 and 64, or other suitable fastener means, such as nuts and bolts, utilize openings 38 and 40 in the second leg portion 46 to firmly attach the first clamp member 12 to source housing 16.

At this point in the assembly, the items 18, 20 and 22 to be protected lie in recesses 48, 50 and 52, respectively, and the second clamp member 14 is assembled with the first clamp member 12. In the assembly process, the first leg portions 44 are placed together such that adjacent recesses 48 and 52, 50 and 50, and 52 and 48, cooperatively define elongated apertures 66, 68 and 70, respectively, which firmly hold items 18, 20 and 22. When clamp members 12 and 14 are properly related, opening 34 of clamp member 12 will be aligned with opening 36 in clamp member 14, and opening 36 of clamp member 12 will be aligned with opening 34 of clamp member 14. Suitable fastener means link the aligned openings, such as nut and bolt assemblies 72 and 74, respectively, to hold clamp members 12 and 14 in assembled relation, to protect items 18, 20 and 22, as well as source housing 16, from damage when an inadvertent outside force is applied. Assembly 10 is also rugged, and will withstand continuous vibration, such as when used on transport refrigeration apparatus, without the danger of eventual cracking due to fatigue.

We claim as our invention:

1. A strain relief clamp comprising:

first and second identical metallic clamp members,
   said first and second clamp members each having first and second ends, and a bend intermediate said ends which defines first and second right angle leg portions which respectively extend from said bend to said first and second ends,
   the first leg portion of each of said first and second clamp members being corrugated to define a plurality of uniformly spaced, integrally joined, curved recesses separated by flat portions,
   and means for fixing said first and second clamp members in assembled relation wherein the spaced curved recesses of the first leg members of the assembly cooperatively define a plurality of elongated open-ended apertures,
   said means for fixing the first and second clamp members in assembled relation including openings defined by the first leg portions located in said flat portions between the spaced curved recesses, and fastener means disposed to link adjacent openings in the first and second clamp members,
   said second leg portions of the first and second clamp members each defining openings adapted to fix one of the first and second clamp members of the assembly to an associated structure,
   said bend which joins the first and second right angle leg portions being a radiused bend which defines a circular arc having a radius of at least about .75 inch to enable each of said first and second clamp members to be formed by a single break and form operation,
   said curved recesses extending in parallel relation from the first end of said first leg portion, through said radiused bend, and partially into said second leg portion.

2. The strain relief clamp of claim 1 wherein the first and second clamp members are formed of stainless steel.

* * * * *